US012770006B2

(12) United States Patent
Kim et al.

(10) Patent No.: US 12,770,006 B2
(45) Date of Patent: Oct. 20, 2026

(54) METHOD AND USER INTERFACE FOR TRAINING ARTIFICIAL NEURAL NETWORK MODELS IN ENVIRONMENT INCLUDING MULTIPLE COMPUTING NODES

(71) Applicant: AIVEX Co., Ltd., Yongin-si (KR)

(72) Inventors: Jaesung Kim, Seoul (KR); Kiwan Kim, Gyeinggi-do (KR)

(73) Assignee: AIVEX Co., Ltd., Yongin-si (KR)

( * ) Notice: Subject to any disclaimer, the term of this patent is extended or adjusted under 35 U.S.C. 154(b) by 0 days.

(21) Appl. No.: 19/252,004

(22) Filed: Jun. 27, 2025

(65) Prior Publication Data

US 2026/0017513 A1 Jan. 15, 2026

(30) Foreign Application Priority Data

Jul. 9, 2024 (KR) ........................ 10-2024-0090281

(51) Int. Cl.
*G06N 3/08* (2023.01)

(52) U.S. Cl.
CPC ..................................... *G06N 3/08* (2013.01)

(58) Field of Classification Search
None
See application file for complete search history.

(56) References Cited

U.S. PATENT DOCUMENTS 8,296,419 B1 * 10/2012 Khanna ................ G06F 9/5072 718/1
11,372,689 B1 * 6/2022 Allen .................... G06F 9/5083
2017/0116038 A1 * 4/2017 Netto ............... G06Q 10/06311
2023/0144238 A1 5/2023 Kim et al.

(Continued)

FOREIGN PATENT DOCUMENTS

JP 107305850 B1 1/2023
KR 20220006490 A 1/2022

(Continued)

OTHER PUBLICATIONS

T. Chen, Q. Tang and G. Liu, "Efficient Task Scheduling and Resource Allocation for AI Training Services in Native AI Wireless Networks," 2023 IEEE International Conference on Communications Workshops (ICC Workshops), Rome, Italy, 2023, pp. 637-642. (Year: 2023).*

(Continued)

*Primary Examiner* — Frank D Mills
(74) *Attorney, Agent, or Firm* — Jodi A. Reynolds; Harter Secrest & Emery LLP

(57) ABSTRACT

Disclosed is a method training an artificial neural network model performed by a computing device according to an exemplary embodiment of the present disclosure. According to the present disclosure, the computing device identifies a first computing node and a second computing node for training an artificial neural network model, acquires information related to a first task for training the artificial neural network model, based on a user input, and dynamically allocates the first task to at least one of the first computing node or the second computing node, and the first computing node includes one or more local computing resources of the user and the second computing node includes one or more cloud computing resources.

14 Claims, 7 Drawing Sheets

(56) References Cited

U.S. PATENT DOCUMENTS

| | | | | |
|---|---|---|---|---|
| 2023/0164227 | A1 | 5/2023 | Mishra et al. | |
| 2023/0206132 | A1 | 6/2023 | Zhu et al. | |
| 2023/0376355 | A1 | 11/2023 | Liu et al. | |
| 2024/0086249 | A1 * | 3/2024 | Hu | G06F 9/5055 |
| 2024/0112789 | A1 * | 4/2024 | Boonn | G06Q 10/063116 |
| 2024/0220329 | A1 * | 7/2024 | Malvankar | G06F 9/5038 |

FOREIGN PATENT DOCUMENTS

| | | | |
|---|---|---|---|
| KR | 1020220006490 | A | 1/2022 |
| KR | 102504445 | B1 | 3/2023 |
| KR | 1020230064963 | A | 5/2023 |
| KR | 1020230067369 | A | 5/2023 |
| KR | 102603724 | B1 | 11/2023 |
| KR | 20230166230 | A | 12/2023 |
| KR | 102636461 | B1 | 2/2024 |
| WO | 2021183954 | A1 | 9/2021 |

OTHER PUBLICATIONS

Y. Li, T. Zeng, X. Zhang, J. Duan and C. Wu, "TapFinger: Task Placement and Fine-Grained Resource Allocation for Edge Machine Learning," IEEE Infocom 2023—IEEE Conference on Computer Communications, New York City, NY, USA, 2023, pp. 1-10. ( Year: 2023).*

Ludberg et al., "How to create a Hybrid MLOps platform using Red Hat OpenShift and Google Cloud." Sep. 13, 2023. https://www.redhat.com/en/blog/how-to-create-a-hybrid-mlops-platform-using-red-hat-openshift-and-google-cloud.

Kaige et al. "Learning to Optimize Workflow Scheduling for an Edge-Cloud Computing Environment", IEEE Transactions on Cloud Computing, IEE vol. 12, No. 3, May 31, 2024, pp. 897-912 XP011981972.

* cited by examiner

METHOD AND USER INTERFACE FOR TRAINING ARTIFICIAL NEURAL NETWORK MODELS IN ENVIRONMENT INCLUDING MULTIPLE COMPUTING NODES

CROSS-REFERENCE TO RELATED APPLICATIONS

This application claims priority to and the benefit of Korean Patent Application No. 10-2024-0090281 filed in the Korean Intellectual Property Office on Jul. 9, 2024, the entire contents of which are incorporated herein by reference.

TECHNICAL FIELD

The present disclosure relates to a method and a user interface for training artificial neural network models in an environment including multiple computing nodes, and particularly, to a method for dynamically allocating a first task to each computing node in an environment in which a first computing node including one or more local computing resources and a second computing node including one or more cloud computing resources exist.

BACKGROUND ART

With the development of artificial intelligence technology, various artificial intelligence models, especially artificial neural network models, are being used in industrial sites, and the demand for high-quality artificial intelligence models continues to rise.

However, the artificial intelligence model needs to be trained in advance before performing inference in a field, and the training of the artificial intelligence model belongs to a task that requires a considerable amount of hardware resources such as a GPU. Conventionally, in the case of providing a service related to an artificial intelligence model, there is a method for performing training in a central cloud environment and transmitting each model locally, or performing training with a local GPU in an on-premise environment. However, when training is performed in the cloud, there is a disadvantage that training data is leaked out of each customer's server and security becomes weak, and when training is performed in the on-premises environment, there is a disadvantage in that a GPU with relatively low performance is used, and there is no update in terms of UX/UI for operating a service, so that a service subject has to perform separate management for each site.

Accordingly, there is a need in the art for a technology that provides a state of the art system to a customer from a service perspective while simultaneously using a cloud environment and an on-premise environment.

Korean Patent Registration No. KR 2636461 B1 discloses an automated labeling method, device, and system for learning artificial intelligence models.

SUMMARY OF THE INVENTION

The present disclosure is contrived in response to the above-described background art, and has been made in an effort to dynamically allocate a first task to each computing node in an environment with a first computing node including one or more local computing resources and a second computing node including one or more cloud computing resources.

Meanwhile, a technical object to be achieved by the present disclosure is not limited to the above-mentioned technical object, and various technical objects can be included within the scope which is apparent to those skilled in the art from contents to be described below.

In order to achieve the above-described object, an exemplary embodiment of the present disclosure provides a method and a user interface for training an artificial neural network model in an environment including multiple computing nodes.

The method may include: identifying a first computing node and a second computing node for training an artificial neural network model; acquiring information related to a first task for training the artificial neural network model, based on a user input; and dynamically allocating the first task to at least one of the first computing node or the second computing node, and the first computing node may include one or more local computing resources of the user, and the second computing node may include one or more cloud computing resources.

In an exemplary embodiment, the dynamically allocating of the first task to at least one of the first computing node or the second computing node may include: identifying information related to a task previously allocated to the first computing node or the second computing node; generating idle computing resource information of the first computing node or the second computing node, based on the information related to the task previously allocated to the first computing node or the second computing node; and dynamically allocating the first task to at least one of the first computing node or the second computing node, based on the idle computing resource information.

In an exemplary embodiment, the dynamically allocating of the first task to at least one of the first computing node and the second computing node, based on the idle computing resource information may include: generating access right information related to the first computing node and the second computing node, based on account information of the user; and dynamically allocating the first task to at least one of the first computing node or the second computing node, based on the idle computing resource information and the access right information.

In an exemplary embodiment, the generating of the access right information related to the first computing node and the second computing node, based on the account information may include generating the access right information related to the first computing node and the second computing node, based on pricing plan information of the user.

In an exemplary embodiment, the dynamically allocating of the first task to at least one of the first computing node or the second computing node, based on the idle computing resource information and the access right information may include, when an idle computing resource of the first computing node is equal to or less than a predetermined threshold and the access right information includes an access right of the second computing node, allocating the first task to the second computing node.

In an exemplary embodiment, the information related to the first task includes information related to one or more sub tasks included in the first task, and the dynamically allocating of the first task to at least one of the first computing node or the second computing node, based on the idle computing resource information and the access right information may include, when the sub tasks are multiple, and the access right information includes the access right of the second computing node, allocating the first task to the second computing node.

In an exemplary embodiment, the method may further include displaying a first user interface related to a task queue for training the artificial neural network model in an environment where the first computing node and the second computing node exist, and the first user interface may include: a first area for displaying a task queue allocated to each of the one or more local computing resources included in the first computing node; and a second area for displaying a task queue allocated to each of the one or more cloud computing resources included in the second computing node.

In an exemplary embodiment, the first area and the second area may include one or more third areas for displaying tasks for training an artificial neural network model.

In an exemplary embodiment, the method may further include displaying a second user interface related to selecting a computing node to which the first task is allocated, based on the input of the user identified while displaying the first user interface, and the second user interface may include a fourth area including a selection area corresponding to the one or more local computing resources included in the first computing node and the one or more cloud computing resources included in the second computing node.

In order to achieve the above-described object, another exemplary embodiment of the present disclosure provides a computer program stored in a computer readable storage medium for allowing a computing device to perform operations for training an artificial neural network model. The operations may include: an operation of identifying a first computing node and a second computing node for training an artificial neural network model; an operation of acquiring information related to a first task for training the artificial neural network model, based on a user input; and an operation of dynamically allocating the first task to at least one of the first computing node or the second computing node, and the first computing node may include one or more local computing resources of the user, and the second computing node may include one or more cloud computing resources.

In order to achieve the above-described object, yet another exemplary embodiment of the present disclosure provides a computing device for training an artificial neural network model. The computing device may include: one or more processors; and a memory, and the one or more processors may be configured to identify a first computing node and a second computing node for training an artificial neural network model, acquire information related to a first task for training the artificial neural network model, based on a user input, and dynamically allocate the first task to at least one of the first computing node or the second computing node, and the first computing node may include one or more local computing resources of the user, and the second computing node may include one or more cloud computing resources.

Due to the present disclosure, when an on-premise environment and a cloud computing environment exist at the same time, a user can allocate a task to perform training of an artificial neural network model in the on-premise environment or the cloud computing environment flexibly according to an idle computing resource situation. Since the task of performing the training of the artificial neural network model is performed in a front-end UI/UX that is continuously updated, a remarkable effect of increasing the efficiency of a user, who is not an expert in a field of artificial intelligence, to train and manage the artificial neural network models occurs as a result.

DETAILED DESCRIPTION

Figure 1:
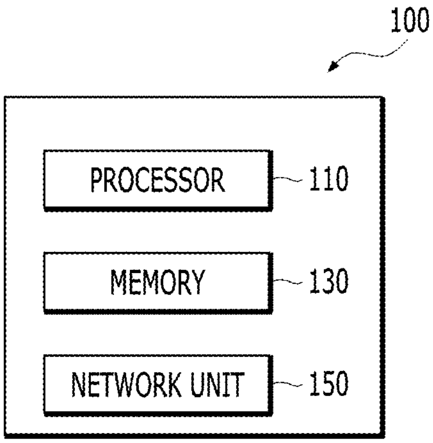
FIG. 1 is a block diagram of a computing device for performing training of an artificial neural network model according to an exemplary embodiment of the present disclosure.

The present disclosure discloses a method for dynamically allocating a first task to each computing node in an environment with a first computing node including one or more local computing resources and a second computing node including one or more cloud computing resources.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing procedure executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, configurations, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

In the present disclosure, a label is data included in training data for training an artificial intelligence model or an artificial neural network model, and the label of the training data serves to provide correct answer or target information for the data. For example, in an image recognition model, a tag indicating which object is present in an image may be the label. Such a label is essential for the model to perform prediction based on input data and learn whether the predictions are correct or incorrect. The more accurate the labeling, the higher the performance of the model, and the wrong label may negatively affect the training of the model. Therefore, a quality of the label is an important factor in the success of the artificial intelligence model.

In the present disclosure, labeling may refer to a task of generating a label corresponding to training data by a person or a computing device.

FIG. 1 is a block diagram of a computing device for performing labeling of training data according to an exemplary embodiment of the present disclosure.

A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for machine learning according to an exemplary embodiment of the present disclosure. According to an exemplary embodiment of the present disclosure, the processor 110 may perform a calculation for learning the neural network. The processor 110 may perform calculations for learning the neural network, which include processing of input data for learning in deep learning (DL), extracting a feature in the input data, calculating an error, updating a weight of the neural network using backpropagation, and the like.

At least one of the CPU, GPGPU, and TPU of the processor 110 may process learning of a network function. For example, both the CPU and the GPGPU may process the learning of the network function and data classification using the network function. Further, in an exemplary embodiment of the present disclosure, processors of a plurality of computing devices may be used together to process the learning of the network function and the data classification using the network function. Further, the computer program executed in the computing device according to an exemplary embodiment of the present disclosure may be a CPU, GPGPU, or TPU executable program.

In the present disclosure, an "on-premise environment" may refer to an IT environment including local computing resources in which servers, network equipment, storage, and the like of an enterprise are physically installed and operated within the enterprise. The on-premise environment is advantageous in terms of security and control because all data and applications are managed internally. However, the on-premise environment requires high initial construction cost and a large amount of resources for maintenance. The on-premise environment is less flexible when compared to a cloud environment, but has an advantage for companies dealing with sensitive data or when strict regulations need to be followed.

In the present disclosure, a front end may refer to a part of developing a screen and an interface directly encountered by a user in a web application or a website. Languages such as HTML, CSS, and JavaScript may be used in the front-end part, and a structure, a style, and an operation of a web page may be implemented. The front end may serve to transmit data, input by the user, to a server, and display data, received from the server, on the screen.

In an exemplary embodiment of the present disclosure, the processor 110 may identify a first computing node and a second computing node for training an artificial neural network model. In this case, the first computing node may include one or more local computing resources of the user, and the second computing node may include one or more cloud computing resources.

The processor 110 may acquire, based on the user input, information related to a first task for training the artificial neural network model. In this case, the user may input the information related to the first task for training the artificial neural network model, through a user interface that is continuously updated at the front end.

The processor 110 may dynamically allocate the first task to at least one of the first computing node or the second computing node. A specific process of dynamically allocating the first task to the first computing node or the second computing node will be described below with reference to FIG. 3.

The processor 110 may display a first user interface related to a task queue for training the artificial neural network model in an environment in which the first computing node and the second computing node exist. The first user interface will be described below in detail with reference to FIG. 5.

Further, the processor 110 may display a second user interface related to selecting the computing node to which the first task is allocated, based on the input of the user identified while displaying the first user interface. The second user interface will be described below in detail with reference to FIG. 6.

According to the present disclosure, tasks for training the artificial neural network model are allocated through a UI/UX of the front end that is continuously updated, so that the user may easily grasp which computing resource is currently available, based on a pricing plan that the user is currently using, and it is possible to dynamically allocate the tasks to the on-premises environment or the cloud environment that the user currently possesses. As a result, the present disclosure has a remarkable effect in that a user who is not an expert in the field of machine learning may easily design the training of the artificial neural network model through the UI/UX and efficiently build a high-performance artificial neural network model.

According to an embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The above description of the memory is just an example and the present disclosure is not limited thereto.

The network unit 150 according to an exemplary embodiment of the present disclosure may use various wired communication systems such as public switched telephone network (PSTN), x digital subscriber line (xDSL), rate adaptive DSL (RADSL), multi rate DSL (MDSL), very high speed DSL (VDSL), universal asymmetric DSL (UADSL), high bit rate DSL (HDSL), and local area network (LAN).

Further, the network unit 150 presented in this specification may use various wireless communication systems such as code division multi access (CDMA), time division multi access (TDMA), frequency division multi access (FDMA), orthogonal frequency division multi access (OFDMA), single carrier-FDMA (SC-FDMA), and other systems.

In the present disclosure, the network unit 150 may use an arbitrary type of wired/wireless communication system.

The techniques described in this specification may also be used in other networks in addition to the aforementioned networks.

Figure 2:
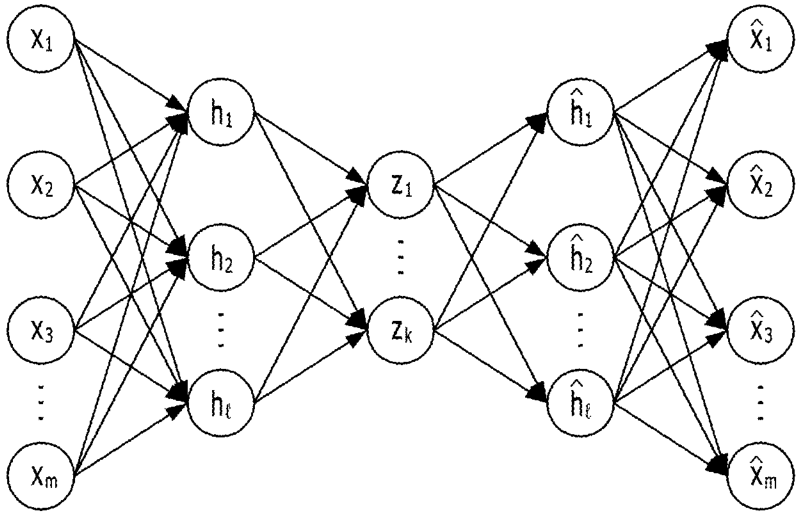
FIG. 2 illustrates an exemplary structure of an artificial intelligence-based model according to an embodiment of the present disclosure.

FIG. 2 illustrates an exemplary structure of an artificial intelligence-based model according to an embodiment of the present disclosure.

Throughout this specification, the artificial intelligence model, an artificial intelligence based model, a computation model, a neural network, a network function, and a neural network may be used as the same meaning.

The neural network may be constituted by an aggregate of calculation units which may be generally called nodes and are mutually connected to each other. The nodes may also be called neurons. The neural network is configured to include one or more nodes. The nodes (or neurons) constituting the neural networks may be connected to each other by one or more links.

In the neural network, one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and may vary by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights, granted to the respective links, in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, definition of the layer is predetermined for description and the order of the layer in the neural network may be defined by a method different from the aforementioned method. For example, the layers of the nodes may be defined by the distance from a final output node.

In an embodiment of the present disclosure, a set of neurons or nodes may be defined as an expression such as layer.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an embodiment of the present disclosure, the number of nodes of the input layer may be the same as the number of nodes of the output layer, and the neural network may be a neural network of a type in which the number of nodes decreases and then increases again from the input layer to the hidden layer. Further, in the neural network according to another embodiment of the present disclosure, the number of nodes of the input layer may be smaller than the number of nodes of the output layer, and the neural network may be a neural network of a type in which the number of nodes decreases from the input layer to the hidden layer. Further, in the neural network according to still another embodiment of the present disclosure, the number of nodes of the input layer may be larger than the number of nodes of the output layer, and the neural network may be a neural network of a type in which the number of nodes increases from the input layer to the hidden layer. The neural network according to yet another embodiment of the present disclosure may be a neural network of a type in which the aforementioned neural networks are combined.

The artificial intelligence based model according to an exemplary embodiment of the present disclosure may include a deep neural network (DNN). The deep neural network may mean a neural network including a plurality of hidden layers other than the input layer and the output layer. When the deep neural network is used, the latent structures of data may be determined. That is, photos, text, video, voice, a protein sequence structure, a gene sequence structure, a peptide sequence structure, music latent structure (e.g., which objects are in the photo, what the content and feelings of the text are, what the content and feelings of the voice are, etc.), and/or a binding affinity between the peptide and MHC may be determined. The deep neural network may include a convolutional neural network (CNN), a recurrent neural network (RNN), an autoencoder (AE), a variational autoencoder (VAE), a restricted Boltzmann machine (RBM), a deep belief network (DBN), a Q network, a U network, a Siam network, a Generative Adversarial Network (GAN), a transformer, and the like. The aforementioned description of the deep neural network is just an example and the present disclosure is not limited thereto.

The artificial intelligence based model of the present disclosure may be expressed by a network structure with any structure described above, which includes the input layer, the hidden layer, and the output layer.

The neural network which may be used in the artificial intelligence based model of the present disclosure may be trained in at least one scheme of supervised learning, unsupervised learning, semi supervised learning, transfer learning, active learning, or reinforcement learning. The training of the neural network may be a process in which the neural network applies knowledge for performing a specific operation to the neural network.

The neural network may be trained in a direction to minimize errors of an output. The training of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data in which each training data is labeled with a correct answer (i.e., the labeled learning data) may be used, and in the case of the unsupervised learning each training data may not be labeled with a correct answer. That is, for example, the learning data in the case of the supervised learning associated with the data classification may be data in which each training data is labeled with a category. The labeled learning data is input to the neural network, and the error may be calculated by comparing the output (category) of the neural network with the label of the learning data. As another example, in the case of the unsupervised learning associated with the data classification, the learning data as the input may be compared with the output of the neural network to calculate the error. The calculated error may be back-propagated in a reverse direction (i.e., a direction from the output layer toward the input layer) in the neural network, and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network may ensure a certain level of performance quickly by using a high learning rate, thereby increasing efficiency, and may use a low learning rate in a latter stage of the learning, thereby increasing accuracy.

In the training of the neural network, the learning data may be generally a subset of actual data (i.e., data to be processed using the trained neural network), and as a result, there may exist a learning cycle in which errors for the learning data decrease, but the errors for the actual data increase. Overfitting is a phenomenon in which the errors for the actual data increase due to excessive learning of the learning data. For example, a phenomenon in which the neural network that learns a cat while seeing a yellow cat does not recognize a cat other than a yellow cat as a cat may be an example of overfitting. The overfitting may act as a cause which increases the error of the machine learning algorithm. Various optimization methods may be used in order to prevent the overfitting. In order to prevent the overfitting, a method such as increasing the learning data, regularization, dropout of deactivating a part of the node of the network in the process of learning, utilization of a batch normalization layer, etc., may be applied.

Figure 3:
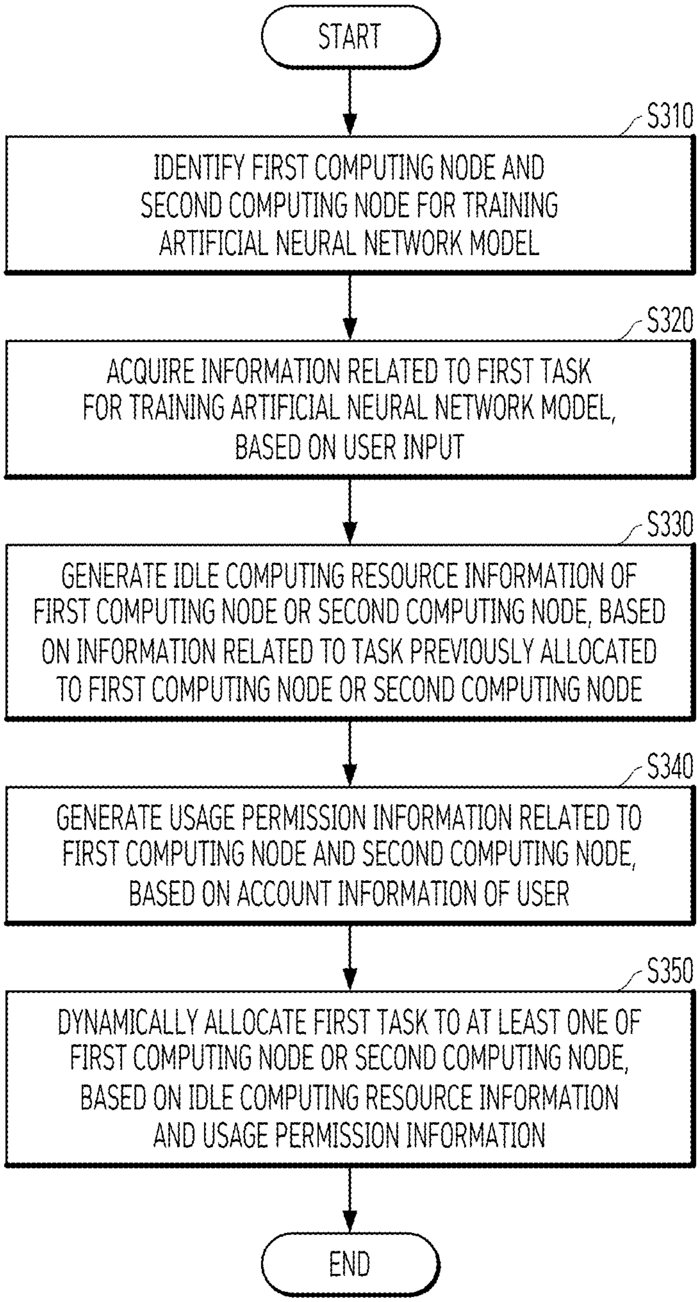
FIG. 3 is a flowchart illustrating a process for performing training of the artificial neural network model according to an exemplary embodiment of the present disclosure.

FIG. 3 is a flowchart illustrating a process for performing training of the artificial neural network model according to an exemplary embodiment of the present disclosure.

A process for performing training of an artificial neural network model according to the present disclosure may include identifying a first computing node and a second computing node for training the artificial neural network model (S310), acquiring, based on a user input, information related to a first task for training the artificial neural network model (S320), generating, based on the information related to a task previously allocated to the first computing node or the second computing node, idle computing resource information of the first computing node and the second computing node (S330), generating access right information related to the first computing node and the second computing node, based on an account information of a user (S340), and dynamically allocating, based on the idle computing resource information and the access right information, the first task to at least one of the first computing node or the second computing node (S350).

In step S310, the processor 110 may identify the first computing node and the second computing node for training the artificial neural network model. It has been described above with reference to FIG. 1 that the first computing node may include one or more local computing resources, and the second computing node may include one or more cloud computing resources.

In step S320, the processor 110 may acquire, based on user input, information related to a first task for training the artificial neural network model. The information related to the first task may include information related to a type of the artificial neural network model to be used for training, information related to a training data set, information related to training batch size, information related to a backbone, and the like.

In step S330, the processor 110 may generate the idle computing resource information of the first computing node or the second computing node, based on the information related to the task previously allocated to the first computing node and the second computing node. In the present disclosure, the processor 110 may identify a task being performed in each local computing resource included in the first computing node, and generate current idle computing resource information of each local computing resource. Further, the processor 110 may identify a task being performed in each cloud computing resource included in the second computing node, and generate idle computing resource information of each cloud computing resource. In the present disclosure, an idle computing resource may refer to a computing resource that is not currently in use and is capable of performing a task such as training of an artificial neural network.

In step S340, the processor 110 may generate access right information related to the first computing node and the second computing node, based on account information of a user. Specifically, the processor 110 may generate the access right information related to the first computing node and the second computing node, based on pricing plan information of the user. For example, based on the pricing plan information of the user in the present disclosure, an account type of the user may be classified into 'basic', 'fast', and 'super fast'. For example, when an account type of a certain user is 'basic', the processor 110 may generate the access right information so that only a GPU existing in the local computing resource, that is, an on-premises environment, held by the user may be used for the training of the artificial neural network model. Further, when an account type of a certain user is 'fast', the processor 110 may generate the access right information so that both a GPU existing in an on-premises environment held by the user and a general type of GPU existing in a cloud environment may be used for the training of the artificial neural network model. Further, when an account type of a certain user is 'super fast', the processor 110 may generate the access right information so that the GPU existing in an on-premise environment held by the user, a general type of GPU existing in a cloud environment, and a special type of GPU having a faster speed existing in the cloud environment may be selectively used for the training of the artificial neural network model.

In step S350, the processor 110 may dynamically allocate the first task to at least one of the first computing node or the second computing node, based on the idle computing resource information and the access right information.

For example, when the account type of the user classified based on the pricing plan that the user is using is 'basic', the processor 110 may allocate the first task to a local computing resource, in which an idle computing resource exists, among local computing resources included in the first computing node.

As another example, when the account type of the user is 'fast' and the idle computing resource does not exist in the first computing node of the user, the processor 110 may allocate the first task to a cloud computing resource, in which the idle computing resource exists, among cloud computing resources included in the second computing node.

As yet another example, when the account type of the user is 'fast' and the idle computing resource of the first computing node is equal to or less than a predetermined threshold, the user has an access right for the second computing node, so the processor 110 may allocate the first task to the cloud computing resource included in the second computing node.

Figure 4:
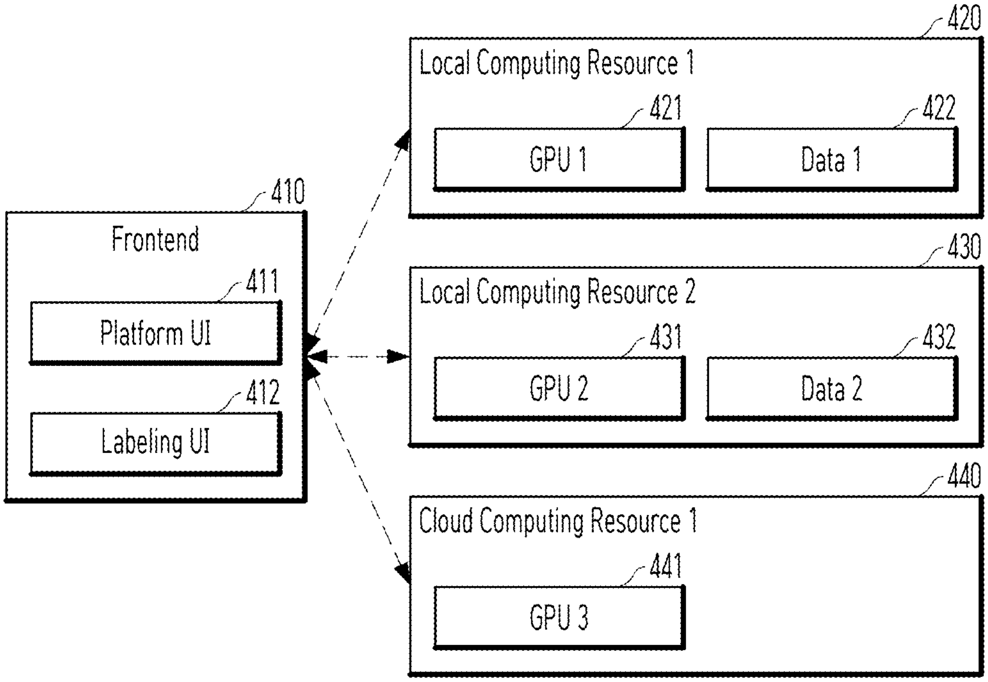
FIG. 4 is a conceptual diagram illustrating a front end and a computing resource for performing training of the artificial neural network model according to an exemplary embodiment of the present disclosure.

FIG. 4 is a conceptual diagram illustrating a front end and a computing resource for performing training of the artificial neural network model according to an exemplary embodiment of the present disclosure.

In the present disclosure, a front end 410 part may include a platform user interface 411 for providing a function of an artificial intelligence platform and a labeling user interface 412 for performing labeling of training data. The interfaces of the front end 410 may continuously be updated in a central server, and may exchange data with each local computing resource and each cloud computing resource.

The front end 410 may exchange data with local computing resources of a plurality of users. For example, the front end 410 may exchange data with all of local computing resources 420 of a first user, local computing resources 430 of a second user, and a cloud computing resources 440.

Each local computing resource may include hardware and training data for performing training of the artificial neural network model. For example, the local computing resource 420 of the first user may include a first GPU 421 to which the first user may allocate a task related to the training of the artificial neural network model, and store a first training data set 422 for which the first user has an access right.

Further, the local computing resource 430 of the second user may include a second GPU 431 to which the second user may allocate the task related to the training of the artificial neural network model, and store a second training data set 432 for which the first user has an access right.

In an exemplary embodiment of the present disclosure, the first user may identify current statuses of the first GPU 421 in the on-premises environment held by the first user and a third GPU 441 included in the cloud computing resource, through the platform user interface 411 included in the front end 410, and allocate a task for training the artificial neural network model through the platform user interface 411 included in the front end 410 so that the task is performed in the first GPU 421, or a third GPU 441 included in the cloud computing resource.

Figure 5:
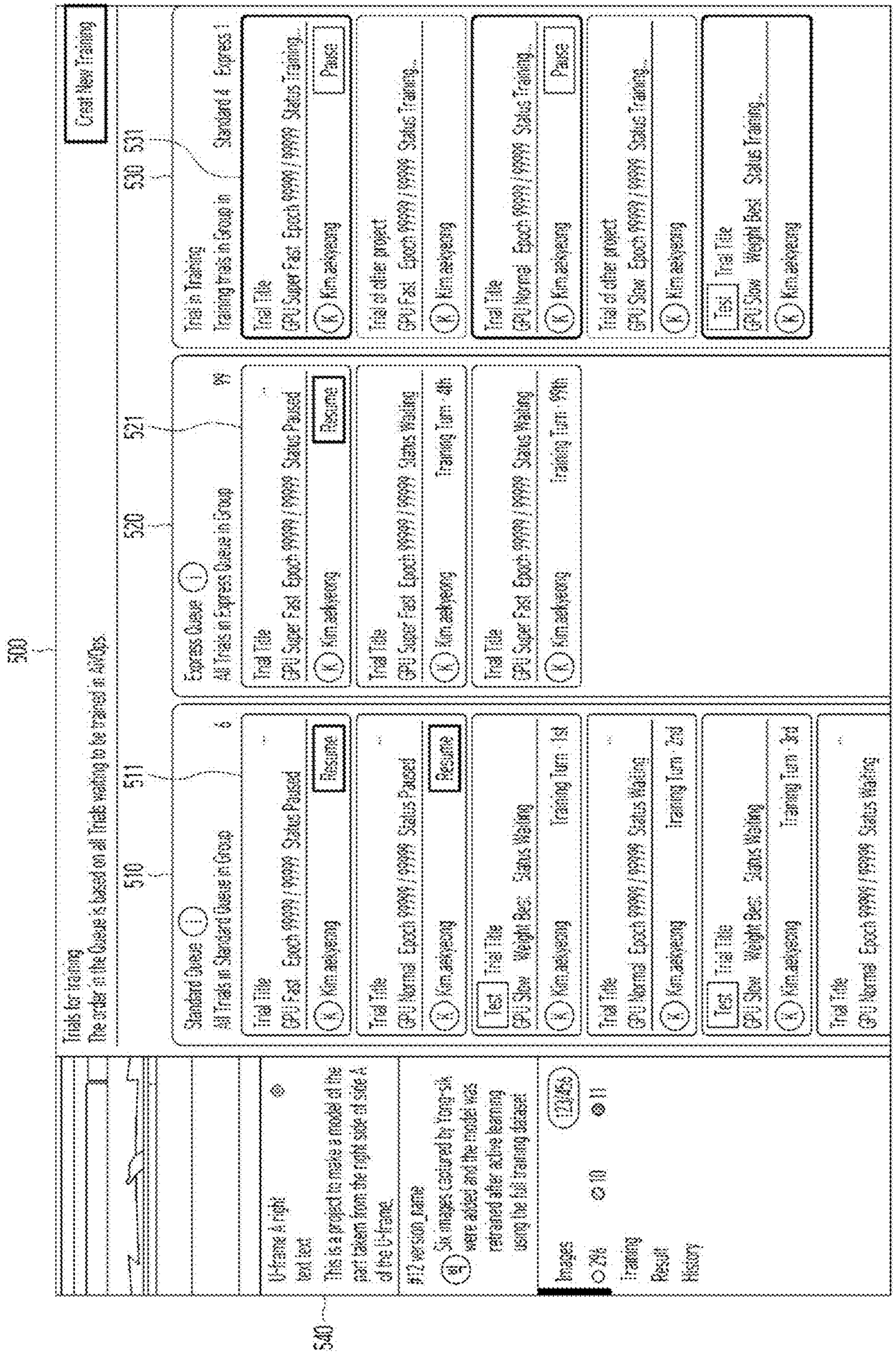
FIG. 5 is a conceptual diagram illustrating a first user interface related to a task queue for training the artificial neural network model according to an exemplary embodiment of the present disclosure.

FIG. 5 is a conceptual diagram illustrating a first user interface related to a task queue for training the artificial neural network model according to an exemplary embodiment of the present disclosure.

The first user interface 500 of the present disclosure may include a first area 510 for displaying a task queue allocated to each of the one or more local computing resources included in the first computing node, and a second area 520 for displaying a task queue allocated to each of the one or more cloud computing resources included in the second computing node.

Additionally, the first user interface 500 of the present disclosure may include a fifth area 530 for displaying a training task of the artificial neural network model currently being performed in each computing resource.

The first area 510, the second area 520, and the fifth area 530 may additionally display sixth regions 511, 521, and 531 for displaying a trial card indicating a training task of the artificial neural network model, respectively.

Figure 6:
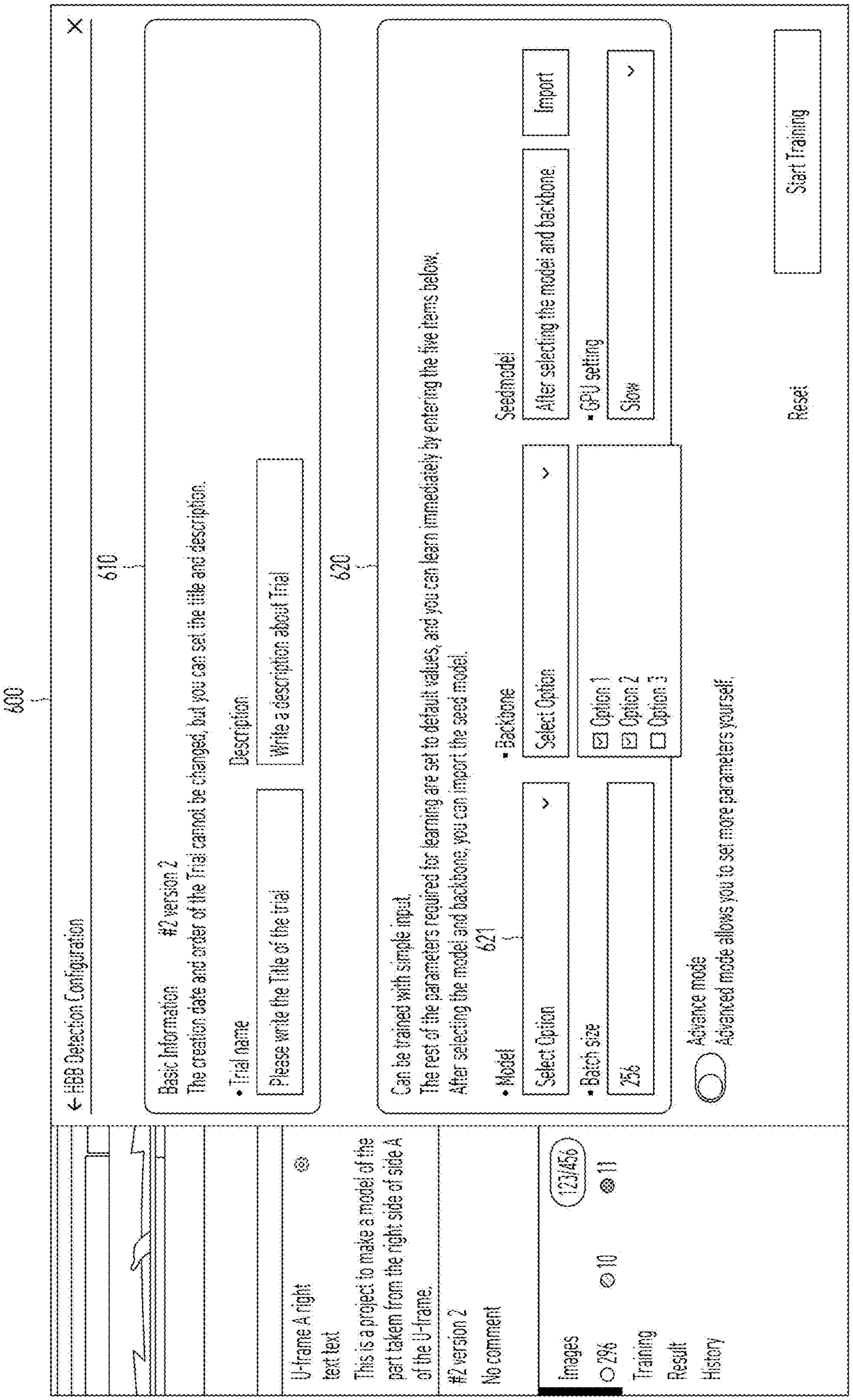
FIG. 6 is a conceptual diagram illustrating a second user interface related to selecting a computing node to which a first task for training the artificial neural network model is allocated according to an exemplary embodiment of the present disclosure.

FIG. 6 is a conceptual diagram illustrating a second user interface related to selecting a computing node to which a first task for training the artificial neural network model is allocated according to an exemplary embodiment of the present disclosure.

In the present disclosure, a second user interface 600 may be displayed based on an input of a user for generating a first task related to training of the artificial neural network model in the first user interface 500.

The second user interface 600 of the present disclosure may include a fourth area 620 including a selection area corresponding to the one or more local computing resources included in the first computing node and the one or more cloud computing resources included in the second computing node. The fourth area may display information related to a model to be used for current learning, information related to a backbone, information related to a batch size, and information related to a training data set.

Further, the second user interface 600 of the present disclosure may further include a sixth area 610 including basic information related to the training of the artificial neural network model.

Disclosed is a computer readable medium storing the data structure according to an exemplary embodiment of the present disclosure.

The data structure may refer to organization, management, and storage of data that enable efficient access and modification of data. The data structure may refer to organization of data for solving a specific problem (for example, data search, data storage, and data modification in the shortest time). The data structure may also be defined with a physical or logical relationship between the data elements designed to support a specific data processing function. A logical relationship between data elements may include a connection relationship between user defined data elements. A physical relationship between data elements may include an actual relationship between the data elements physically stored in a computer readable storage medium (for example, a permanent storage device). In particular, the data structure may include a set of data, a relationship between data, and a function or a command applicable to data. Through the effectively designed data structure, the computing device may perform a calculation while minimally using resources of the computing device. In particular, the computing device may improve efficiency of calculation, reading, insertion, deletion, comparison, exchange, and search through the effectively designed data structure.

The data structure may be divided into a linear data structure and a non-linear data structure according to the form of the data structure. The linear data structure may be the structure in which only one data is connected after one data. The linear data structure may include a list, a stack, a queue, and a deque. The list may mean a series of dataset in which order exists internally. The list may include a linked list. The linked list may have a data structure in which data is connected in a method in which each data has a pointer and is linked in a single line. In the linked list, the pointer may include information about the connection with the next or previous data. The linked list may be expressed as a single linked list, a double linked list, and a circular linked list according to the form. The stack may have a data listing structure with limited access to data. The stack may have a linear data structure that may process (for example, insert or delete) data only at one end of the data structure. The data stored in the stack may have a data structure (Last In First Out, LIFO) in which the later the data enters, the sooner the data comes out. The queue is a data listing structure with limited access to data, and may have a data structure (First In First Out, FIFO) in which the later the data is stored, the later the data comes out, unlike the stack. The deque may have a data structure that may process data at both ends of the data structure.

The non-linear data structure may be the structure in which the plurality of data is connected after one data. The non-linear data structure may include a graph data structure. The graph data structure may be defined with a vertex and an edge, and the edge may include a line connecting two different vertexes. The graph data structure may include a tree data structure. The tree data structure may be the data structure in which a path connecting two different vertexes among the plurality of vertexes included in the tree is one. That is, the tree data structure may be the data structure in which a loop is not formed in the graph data structure.

Throughout the present specification, a calculation model, a nerve network, the network function, and the neural network may be used with the same meaning. Hereinafter, the terms of the calculation model, the nerve network, the network function, and the neural network are unified and described with a neural network. The data structure may include a neural network. Further, the data structure including the neural network may be stored in a computer readable medium. The data structure including the neural network may also include preprocessed data for processing by the neural network, data input to the neural network, a weight of the neural network, a hyper-parameter of the neural network, data obtained from the neural network, an active function associated with each node or layer of the neural network, and a loss function for training of the neural network. The data structure including the neural network may include predetermined configuration elements among the disclosed configurations. That is, the data structure including the neural network may include the entirety or a predetermined combination of pre-processed data for processing by neural network, data input to the neural network, a weight of the neural network, a hyper parameter of the neural network, data obtained from the neural network, an active function associated with each node or layer of the neural network, and a loss function for training the neural network. In addition to the foregoing configurations, the data structure including the neural network may include predetermined other information determining a characteristic of the neural network. Further, the data structure may include all type of data used or generated in a computation process of the neural network, and is not limited to the foregoing matter. The computer readable medium may include a computer readable recording medium and/or a computer readable transmission medium. The neural network may be formed of a set of interconnected calculation units which are generally referred to as “nodes”. The “nodes” may also be called “neurons.” The neural network consists of one or more nodes.

The data structure may include data input to the neural network. The data structure including the data input to the neural network may be stored in the computer readable medium. The data input to the neural network may include training data input in the training process of the neural network and/or input data input to the training completed neural network. The data input to the neural network may include data that has undergone pre-processing and/or data to be pre-processed. The pre-processing may include a data processing process for inputting data to the neural network. Accordingly, the data structure may include data to be pre-processed and data generated by the pre-processing. The foregoing data structure is merely an example, and the present disclosure is not limited thereto.

The data structure may include a weight of the neural network (in the present specification, weights and parameters may be used with the same meaning), Further, the data structure including the weight of the neural network may be stored in the computer readable medium. The neural network may include a plurality of weights. The weight is variable, and in order for the neural network to perform a desired function, the weight may be varied by a user or an algorithm. For example, when one or more input nodes are connected to one output node by links, respectively, the output node may determine a data value output from the output node based on values input to the input nodes connected to the output node and the weight set in the link corresponding to each of the input nodes. The foregoing data structure is merely an example, and the present disclosure is not limited thereto.

For a non-limited example, the weight may include a weight varied in the neural network training process and/or the weight when the training of the neural network is completed. The weight varied in the neural network training process may include a weight at a time at which a training cycle starts and/or a weight varied during a training cycle. The weight when the training of the neural network is completed may include a weight of the neural network completing the training cycle. Accordingly, the data structure including the weight of the neural network may include the data structure including the weight varied in the neural network training process and/or the weight when the training of the neural network is completed. Accordingly, it is assumed that the weight and/or a combination of the respective weights are included in the data structure including the weight of the neural network. The foregoing data structure is merely an example, and the present disclosure is not limited thereto.

The data structure including the weight of the neural network may be stored in the computer readable storage medium (for example, a memory and a hard disk) after undergoing a serialization process. The serialization may be the process of storing the data structure in the same or different computing devices and converting the data structure into a form that may be reconstructed and used later. The computing device may serialize the data structure and transceive the data through a network. The serialized data structure including the weight of the neural network may be reconstructed in the same or different computing devices through deserialization. The data structure including the weight of the neural network is not limited to the serialization. Further, the data structure including the weight of the neural network may include a data structure (for example, in the non-linear data structure, B-Tree, Trie, m-way search tree, AVL tree, and Red-Black Tree) for improving efficiency of the calculation while minimally using the resources of the computing device. The foregoing matter is merely an example, and the present disclosure is not limited thereto.

The data structure may include a hyper-parameter of the neural network. The data structure including the hyper-parameter of the neural network may be stored in the computer readable medium. The hyper-parameter may be a variable varied by a user. The hyper-parameter may include, for example, a learning rate, a cost function, the number of times of repetition of the training cycle, weight initialization (for example, setting of a range of a weight value to be weight-initialized), and the number of hidden units (for example, the number of hidden layers and the number of nodes of the hidden layer). The foregoing data structure is merely an example, and the present disclosure is not limited thereto.

Figure 7:
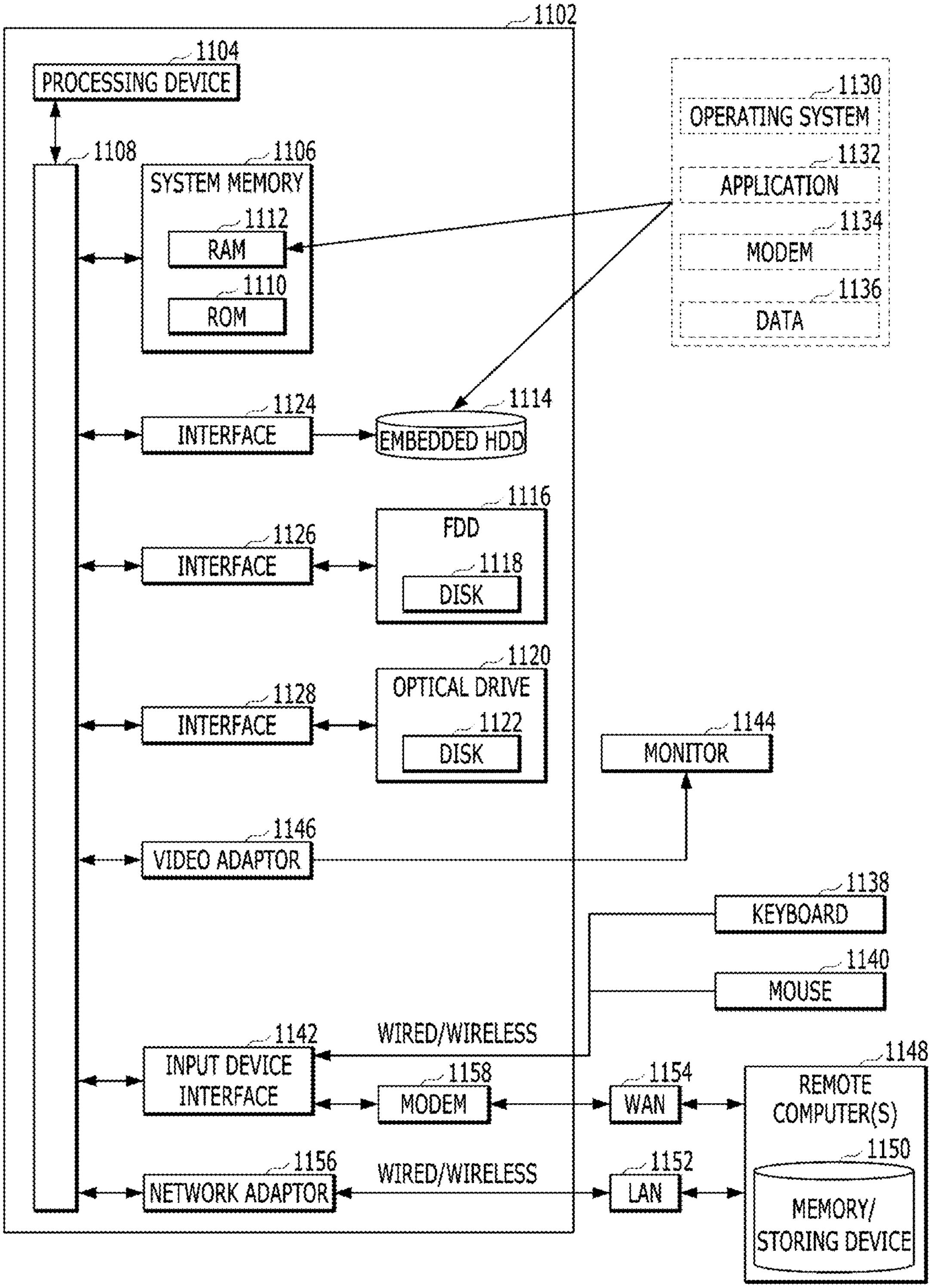
FIG. 7 is a simple and normal schematic view of an exemplary computing environment in which the exemplary embodiments of the present disclosure may be implemented.

FIG. 7 is a simple and normal schematic view of an exemplary computing environment in which the exemplary embodiments of the present disclosure may be implemented.

The present disclosure has been described as being generally implementable by the computing device, but those skilled in the art will appreciate well that the present disclosure is combined with computer executable commands and/or other program modules executable in one or more computers and/or be implemented by a combination of hardware and software.

In general, a program module includes a routine, a program, a component, a data structure, and the like performing a specific task or implementing a specific abstract data form. Further, those skilled in the art will well appreciate that the method of the present disclosure may be carried out by a personal computer, a hand-held computing device, a microprocessor-based or programmable home appliance (each of which may be connected with one or more relevant devices and be operated), and other computer system configurations, as well as a single-processor or multiprocessor computer system, a mini computer, and a main frame computer.

The embodiments of the present disclosure may be carried out in a distribution computing environment, in which certain tasks are performed by remote processing devices connected through a communication network. In the distribution computing environment, a program module may be located in both a local memory storage device and a remote memory storage device.

The computer generally includes various computer readable media. The computer accessible medium may be any type of computer readable medium, and the computer readable medium includes volatile and non-volatile media, transitory and non-transitory media, and portable and non-portable media. As a non-limited example, the computer readable medium may include a computer readable storage medium and a computer readable transport medium. The computer readable storage medium includes volatile and non-volatile media, transitory and non-transitory media, and portable and non-portable media constructed by a predetermined method or technology, which stores information, such as a computer readable command, a data structure, a program module, or other data. The computer readable storage medium includes a RAM, a Read Only Memory (ROM), an Electrically Erasable and Programmable ROM (EEPROM), a flash memory, or other memory technologies, a Compact Disc (CD)-ROM, a Digital Video Disk (DVD), or other optical disk storage devices, a magnetic cassette, a magnetic tape, a magnetic disk storage device, or other magnetic storage device, or other predetermined media, which are accessible by a computer and are used for storing desired information, but is not limited thereto.

The computer readable transport medium generally implements a computer readable command, a data structure, a program module, or other data in a modulated data signal, such as a carrier wave or other transport mechanisms, and includes all of the information transport media. The modulated data signal means a signal, of which one or more of the characteristics are set or changed so as to encode information within the signal. As a non-limited example, the computer readable transport medium includes a wired medium, such as a wired network or a direct-wired connection, and a wireless medium, such as sound, Radio Frequency (RF), infrared rays, and other wireless media. A combination of the predetermined media among the foregoing media is also included in a range of the computer readable transport medium.

An illustrative environment 1100 including a computer 1102 and implementing several aspects of the present disclosure is illustrated, and the computer 1102 includes a processing device 1104, a system memory 1106, and a system bus 1108. The system bus 1108 connects system components including the system memory 1106 (not limited) to the processing device 1104. The processing device 1104 may be a predetermined processor among various commonly used processors. A dual processor and other multi-processor architectures may also be used as the processing device 1104.

The system bus 1108 may be a predetermined one among several types of bus structure, which may be additionally connectable to a local bus using a predetermined one among a memory bus, a peripheral device bus, and various common bus architectures. The system memory 1106 includes a ROM 1110, and a RAM 1112. A basic input/output system (BIOS) is stored in a non-volatile memory 1110, such as a ROM, an EPROM, and an EEPROM, and the BIOS includes a basic routing helping a transport of information among the constituent elements within the computer 1102 at a time, such as starting. The RAM 1112 may also include a high-rate RAM, such as a static RAM, for caching data.

The computer 1102 also includes an embedded hard disk drive (HDD) 1114 (for example, enhanced integrated drive electronics (EIDE) and serial advanced technology attachment (SATA))—the embedded HDD 1114 being configured for exterior mounted usage within a proper chassis (not illustrated)—a magnetic floppy disk drive (FDD) 1116 (for example, which is for reading data from a portable diskette 1118 or recording data in the portable diskette 1118), and an optical disk drive 1120 (for example, which is for reading a CD-ROM disk 1122, or reading data from other high-capacity optical media, such as a DVD, or recording data in the high-capacity optical media). A hard disk drive 1114, a magnetic disk drive 1116, and an optical disk drive 1120 may be connected to a system bus 1108 by a hard disk drive interface 1124, a magnetic disk drive interface 1126, and an optical drive interface 1128, respectively. An interface 1124 for implementing an outer mounted drive includes, for example, at least one of or both a universal serial bus (USB) and the Institute of Electrical and Electronics Engineers (IEEE) 1394 interface technology.

The drives and the computer readable media associated with the drives provide non-volatile storage of data, data structures, computer executable commands, and the like. In the case of the computer 1102, the drive and the medium correspond to the storage of random data in an appropriate digital form. In the description of the computer readable media, the HDD, the portable magnetic disk, and the portable optical media, such as a CD, or a DVD, are mentioned, but those skilled in the art will well appreciate that other types of computer readable media, such as a zip drive, a magnetic cassette, a flash memory card, and a cartridge, may also be used in the illustrative operation environment, and the predetermined medium may include computer executable commands for performing the methods of the present disclosure.

A plurality of program modules including an operation system 1130, one or more application programs 1132, other program modules 1134, and program data 1136 may be stored in the drive and the RAM 1112. An entirety or a part of the operation system, the application, the module, and/or data may also be cached in the RAM 1112. It will be well appreciated that the present disclosure may be implemented by several commercially usable operation systems or a combination of operation systems.

A user may input a command and information to the computer 1102 through one or more wired/wireless input devices, for example, a keyboard 1138 and a pointing device, such as a mouse 1140. Other input devices (not illustrated) may be a microphone, an IR remote controller, a joystick, a game pad, a stylus pen, a touch screen, and the like. The foregoing and other input devices are frequently connected to the processing device 1104 through an input device interface 1142 connected to the system bus 1108, but may be connected by other interfaces, such as a parallel port, an IEEE 1394 serial port, a game port, a USB port, an IR interface, and other interfaces.

A monitor 1144 or other types of display devices are also connected to the system bus 1108 through an interface, such as a video adaptor 1146. In addition to the monitor 1144, the computer generally includes other peripheral output devices (not illustrated), such as a speaker and a printer.

The computer 1102 may be operated in a networked environment by using a logical connection to one or more remote computers, such as remote computer(s) 1148, through wired and/or wireless communication. The remote computer(s) 1148 may be a work station, a computing device computer, a router, a personal computer, a portable computer, a microprocessor-based entertainment device, a peer device, and other general network nodes, and generally includes some or an entirety of the constituent elements described for the computer 1102, but only a memory storage device 1150 is illustrated for simplicity. The illustrated logical connection includes a wired/wireless connection to a local area network (LAN) 1152 and/or a larger network, for example, a wide area network (WAN) 1154. The LAN and WAN networking environments are general in an office and a company, and make an enterprise-wide computer network, such as an Intranet, easy, and all of the LAN and WAN networking environments may be connected to a worldwide computer network, for example, the Internet.

When the computer 1102 is used in the LAN networking environment, the computer 1102 is connected to the local network 1152 through a wired and/or wireless communication network interface or an adaptor 1156. The adaptor 1156 may make wired or wireless communication to the LAN 1152 easy, and the LAN 1152 also includes a wireless access point installed therein for the communication with the wireless adaptor 1156. When the computer 1102 is used in the WAN networking environment, the computer 1102 may include a modem 1158, is connected to a communication computing device on a WAN 1154, or includes other means setting communication through the WAN 1154 via the Internet. The modem 1158, which may be an embedded or outer-mounted and wired or wireless device, is connected to the system bus 1108 through a serial port interface 1142. In the networked environment, the program modules described for the computer 1102 or some of the program modules may be stored in a remote memory/storage device 1150. The illustrated network connection is illustrative, and those skilled in the art will appreciate well that other means setting a communication link between the computers may be used.

The computer 1102 performs an operation of communicating with a predetermined wireless device or entity, for example, a printer, a scanner, a desktop and/or portable computer, a portable data assistant (PDA), a communication satellite, predetermined equipment or place related to a wirelessly detectable tag, and a telephone, which is disposed by wireless communication and is operated. The operation includes a wireless fidelity (Wi-Fi) and Bluetooth wireless technology at least. Accordingly, the communication may have a pre-defined structure, such as a network in the related art, or may be simply ad hoc communication between at least two devices.

The Wi-Fi enables a connection to the Internet and the like even without a wire. The Wi-Fi is a wireless technology, such as a cellular phone, which enables the device, for example, the computer, to transmit and receive data indoors and outdoors, that is, in any place within a communication range of a base station. A Wi-Fi network uses a wireless technology, which is called IEEE 802.11 (a, b, g, etc.) for providing a safe, reliable, and high-rate wireless connection. The Wi-Fi may be used for connecting the computer to the computer, the Internet, and the wired network (IEEE 802.3 or Ethernet is used). The Wi-Fi network may be operated at, for example, a data rate of 11 Mbps (802.11a) or 54 Mbps (802.11b) in an unauthorized 2.4 and 5 GHz wireless band, or may be operated in a product including both bands (dual bands).

Those skilled in the art may appreciate that information and signals may be expressed by using predetermined various different technologies and techniques. For example, data, indications, commands, information, signals, bits, symbols, and chips referable in the foregoing description may be expressed with voltages, currents, electromagnetic waves, magnetic fields or particles, optical fields or particles, or a predetermined combination thereof.

Those skilled in the art will appreciate that the various illustrative logical blocks, modules, processors, means, circuits, and algorithm operations described in relationship to the embodiments disclosed herein may be implemented by electronic hardware (for convenience, called "software" herein), various forms of program or design code, or a combination thereof. In order to clearly describe compatibility of the hardware and the software, various illustrative components, blocks, modules, circuits, and operations are generally illustrated above in relation to the functions of the hardware and the software. Whether the function is implemented as hardware or software depends on design limits given to a specific application or an entire system. Those skilled in the art may perform the function described by various schemes for each specific application, but it shall not be construed that the determinations of the performance depart from the scope of the present disclosure.

Various embodiments presented herein may be implemented by a method, a device, or a manufactured article using a standard programming and/or engineering technology. A term "manufactured article" includes a computer program, a carrier, or a medium accessible from a predetermined computer-readable storage device. For example, the computer-readable storage medium includes a magnetic storage device (for example, a hard disk, a floppy disk, and a magnetic strip), an optical disk (for example, a CD and a DVD), a smart card, and a flash memory device (for example, an EEPROM, a card, a stick, and a key drive), but is not limited thereto. Further, various storage media presented herein include one or more devices and/or other machine-readable media for storing information.

It shall be understood that a specific order or a hierarchical structure of the operations included in the presented processes is an example of illustrative accesses. It shall be understood that a specific order or a hierarchical structure of the operations included in the processes may be rearranged within the scope of the present disclosure based on design priorities. The accompanying method claims provide various operations of elements in a sample order, but it does not mean that the claims are limited to the presented specific order or hierarchical structure.

The description of the presented embodiments is provided so as for those skilled in the art to use or carry out the present disclosure. Various modifications of the embodiments may be apparent to those skilled in the art, and general principles defined herein may be applied to other embodiments without departing from the scope of the present disclosure. Accordingly, the present disclosure is not limited to the embodiments suggested herein, and shall be interpreted within the broadest meaning range consistent to the principles and new characteristics presented herein.

What is claimed is:

1. A method for training an artificial neural network model performed by a computing device, the method comprising:

identifying a first computing node and a second computing node for training an artificial neural network model;

identifying information related to a task previously allocated to the first computing node or the second computing node;

generating idle computing resource information of the first computing node or the second computing node, based on the information related to the task previously allocated to the first computing node or the second computing node;

acquiring information related to a first task for training the artificial neural network model, based on a user input, wherein the user input comprises at least one of a type of artificial neural network model to be used for training, information relating to the training data set, information relating to the batch size, or information relating to the backbone;

dynamically allocating the first task to at least one of the first computing node or the second computing node, based on the idle computing resource information;

exchanging the information related to the first task and performing the training of the first task on one of the first or the second allocated computing node; and displaying a first user interface related to a task queue for training the artificial neural network model in an environment where the first computing node and the second computing node exist, wherein the first computing node includes one or more local computing resources of the user, wherein the second computing node includes one or more cloud computing resources, and wherein the first user interface is continuously updated with information from the first and second computing node and further includes:

a first area for displaying a task queue allocated to each of the one or more local computing resources included in the first computing node; and a second area for displaying a task queue allocated to each of the one or more cloud computing resources included in the second computing node.

2. The method of claim 1, wherein the dynamically allocating of the first task to at least one of the first computing node or the second computing node, based on the idle computing resource information includes:

generating access right information related to the first computing node and the second computing node, based on account information of the user; and dynamically allocating the first task to at least one of the first computing node or the second computing node, based on the idle computing resource information and the access right information.

3. The method of claim 2, wherein the generating of the access right information related to the first computing node and the second computing node, based on the account information includes:

generating the access right information related to the first computing node and the second computing node, based on pricing plan information of the user.

4. The method of claim 3, wherein the dynamically allocating of the first task to at least one of the first computing node or the second computing node, based on the idle computing resource information and the access right information includes:

when an idle computing resource of the first computing node is equal to or less than a predetermined threshold and the access right information includes an access right of the second computing node, allocating the first task to the second computing node.

5. The method of claim 3, wherein the information related to the first task includes information related to one or more sub tasks included in the first task, and wherein the dynamically allocating of the first task to at least one of the first computing node or the second computing node, based on the idle computing resource information and the access right information includes:

when the sub tasks are multiple, and the access right information includes the access right of the second computing node, allocating the first task to the second computing node.

6. The method of claim 1, wherein the first area and the second area include one or more third areas for displaying tasks for training an artificial neural network model.

7. The method of claim 6, further comprising:

displaying a second user interface related to selecting one of the first computing node or the second computing node to which the first task is allocated, based on an input of the user identified while displaying the first user interface, wherein the second user interface includes a fourth area for displaying a selection area corresponding to the one or more local computing resources included in the first computing node and the one or more cloud computing resources included in the second computing node.

8. The method of claim 1, wherein the first user interface includes a labeling interface for performing labeling of training data.

9. A computer program stored in a non-transitory computer readable storage medium for allowing a computing device to perform operations for training an artificial neural network model, the operations comprising:

an operation of identifying a first computing node and a second computing node for training an artificial neural network model;

an operation of identifying information related to a task previously allocated to the first computing node or the second computing node;

an operation of generating idle computing resource information of the first computing node or the second computing node, based on the information related to the task previously allocated to the first computing node and the second computing node;

an operation of acquiring information related to a first task for training the artificial neural network model, based on a user input, wherein the user input comprises at least one of a type of artificial neural network model to be used for training, information relating to the training data set, information relating to the batch size, or information relating to the backbone;

an operation of dynamically allocating the first task to at least one of the first computing node or the second computing node, based on the idle computing resource information;

an operation of exchanging information related to the first task and performing the training of the first task on one of the first or the second allocated computing node; and an operation of displaying a first user interface related to a task queue for training the artificial neural network model in an environment where the first computing node and the second computing node exist, wherein the first computing node includes one or more local computing resources of the user, wherein the second computing node includes one or more cloud computing resources, and wherein the first user interface is continuously updated with information from the first and second computing node and further includes:

a first area for displaying a task queue allocated to each of the one or more local computing resources included in the first computing node; and a second area for displaying a task queue allocated to each of the one or more cloud computing resources included in the second computing node.

10. The computer program of claim 9, wherein the operation of dynamically allocating the first task to at least one of the first computing node or the second computing node, based on the idle computing resource information includes:

an operation of generating access right information related to the first computing node and the second computing node, based on account information of the user; and an operation of dynamically allocating the first task to at least one of the first computing node or the second computing node, based on the idle computing resource information and the access right information.

11. The computer program of claim 10, wherein the operation of dynamically allocating the first task to at least one of the first computing node or the second computing node, based on the idle computing resource information includes:

an operation of dynamically allocating the first task to the second computing node based on the access right information and the idle computing resource of the first computing node being equal to or less than a predetermined threshold.

12. A computing device for training an artificial neural network model, the computing device comprising:

one or more processors; and a memory, wherein the one or more processors are configured to:

identify a first computing node and a second computing node for training an artificial neural network model, identify information related to a task previously allocated to the first computing node or the second computing node, generate idle computing resource information of the first computing node or the second computing node, based on the information related to the task previously allocated to the first computing node or the second computing node, acquire information related to a first task for training the artificial neural network model, based on a user input, wherein the user input comprises at least one of a type of artificial neural network model to be used for training, information relating to the training data set, information relating to the batch size, or information relating to the backbone;

dynamically allocate the first task to at least one of the first computing node or the second computing node, based on the idle computing resource information;

exchanging information related to the first task and performing the training of the first task on one of the first or the second allocated computing node; and display a first user interface related to a task queue for training the artificial neural network model in an environment where the first computing node and the second computing node exist, wherein the first computing node includes one or more local computing resources of the user, wherein the second computing node includes one or more cloud computing resources, and wherein the first user interface is continuously updated with information from the first and second computing node and further includes:

a first area for displaying a task queue allocated to each of the one or more local computing resources included in the first computing node; and a second area for displaying a task queue allocated to each of the one or more cloud computing resources included in the second computing node.

13. The computing device of claim 12, wherein the dynamically allocating of the first task to at least one of the first computing node or the second computing node, based on the idle computing resource information includes:

generating access right information related to the first computing node and the second computing node, based on account information of the user; and dynamically allocating the first task to at least one of the first computing node or the second computing node, based on the idle computing resource information and the access right information.

14. The computing device of claim 12, wherein the dynamic allocation of the first task to at least one of the first computing node or the second computing node, includes: a second user interface for generating the first task, wherein the second interface includes fields for inputting the user input and a selection of the preferred computing resource.

* * * * *